US012669666B2

(12) United States Patent
Miyata et al.

(10) Patent No.: US 12,669,666 B2
(45) Date of Patent: Jun. 30, 2026

(54) OPTICAL FIBER CABLE

(71) Applicant: Fujikura Ltd., Tokyo (JP)

(72) Inventors: Miku Miyata, Sakura (JP); Akira Murata, Sakura (JP)

(73) Assignee: Fujikura Ltd., Tokyo (JP)

( * ) Notice: Subject to any disclaimer, the term of this patent is extended or adjusted under 35 U.S.C. 154(b) by 56 days.

(21) Appl. No.: 18/032,508

(22) PCT Filed: Jul. 6, 2021

(86) PCT No.: PCT/JP2021/025418
§ 371 (c)(1),
(2) Date: Apr. 18, 2023

(87) PCT Pub. No.: WO2022/085245
PCT Pub. Date: Apr. 28, 2022

(65) Prior Publication Data
US 2023/0393359 A1 Dec. 7, 2023

(30) Foreign Application Priority Data

Oct. 19, 2020 (JP) ................................. 2020-175528

(51) Int. Cl.
*G02B 6/44* (2006.01)
*G02B 6/02* (2006.01)
(52) U.S. Cl.
CPC ....... *G02B 6/4432* (2013.01); *G02B 6/02395* (2013.01); *G02B 6/4434* (2013.01)
(58) Field of Classification Search
None
See application file for complete search history.

(56) References Cited

U.S. PATENT DOCUMENTS

| | | | | |
|---|---|---|---|---|
| 5,125,063 A | * | 6/1992 | Panuska | G02B 6/4405 |
| | | | | 385/113 |
| 7,272,289 B2 | * | 9/2007 | Bickham | G02B 6/03638 |
| | | | | 385/100 |

(Continued)

FOREIGN PATENT DOCUMENTS

| | | | | |
|---|---|---|---|---|
| CN | 102057309 A | | 5/2011 | |
| CN | 106716198 A | * | 5/2017 | ......... G02B 6/02009 |

(Continued)

OTHER PUBLICATIONS

J. Baldauf, et al., "Relationship of Mechanical Characteristics of Dual Coated Single Mode Optical Fibers and Microbending Loss," IEICE Trans. Commun., vol. E76-B, No. 4, Apr. 4, 1993 (6 pages).

(Continued)

*Primary Examiner* — Chris H Chu
(74) *Attorney, Agent, or Firm* — Osha Bergman Watanabe & Burton LLP

(57) ABSTRACT

An optical fiber cable includes: optical fibers each including a glass portion including a core and a cladding surrounding the core, a primary covering layer covering the cladding, and a secondary covering layer covering the primary covering layer; and a sheath accommodating the optical fibers in an internal space. A value of a micro-bend loss characteristic factor $F_{\mu BL\_GO}$ is $5.2 \times 10^{23}$ or less when represented by $$F_{\mu BL\_GO} = F_{\mu BL\_G} \times F_{\mu BL\_O} \times Dc.$$

14 Claims, 2 Drawing Sheets

(56) References Cited

U.S. PATENT DOCUMENTS

| | | | | |
|---|---|---|---|---|
| 8,041,168 | B2 * | 10/2011 | Overton | G02B 6/4411 |
| | | | | 385/100 |
| 2007/0077016 | A1 * | 4/2007 | Bickham | G02B 6/0285 |
| | | | | 385/128 |
| 2011/0110635 | A1 * | 5/2011 | Toge | G02B 6/441 |
| | | | | 385/102 |
| 2012/0099112 | A1 * | 4/2012 | Alphonse | G01B 9/02044 |
| | | | | 385/12 |
| 2015/0192734 | A1 | 7/2015 | Homma et al. | |
| 2017/0097464 | A1 | 4/2017 | Challener et al. | |
| 2017/0285285 | A1 * | 10/2017 | Hoshino | G02B 6/4403 |
| 2017/0343751 | A1 * | 11/2017 | Bookbinder | G02B 6/4432 |
| 2019/0278020 | A1 | 9/2019 | Kawaguchi et al. | |
| 2019/0285823 | A1 * | 9/2019 | Tanaka | G02B 6/4482 |
| 2019/0331848 | A1 | 10/2019 | Bennett et al. | |
| 2020/0073068 | A1 * | 3/2020 | Shimizu | G02B 6/4432 |
| 2021/0018705 | A1 * | 1/2021 | Sahoo | G02B 6/562 |

FOREIGN PATENT DOCUMENTS

| | | | | |
|---|---|---|---|---|
| CN | 108663761 | A | 10/2018 | |
| CN | 110244404 | A * | 9/2019 | G02B 6/02395 |
| CN | 113099726 | A | 7/2021 | |
| CN | 116324557 | A | 6/2023 | |
| JP | 2006528374 | A | 12/2006 | |
| JP | 2010008923 | A | 1/2010 | |
| JP | 2012508395 | A | 4/2012 | |
| JP | 2013120284 | A | 6/2013 | |
| JP | 2013127608 | A | 6/2013 | |
| JP | 2017062486 | A | 3/2017 | |
| JP | 6170924 | B2 | 7/2017 | |
| JP | 2018081328 | A | 5/2018 | |
| JP | 2018169431 | A | 11/2018 | |
| JP | 6728298 | B2 | 7/2020 | |
| JP | 2020149068 | A | 9/2020 | |
| TW | 666471 | B | 7/2019 | |
| WO | 2019172022 | A1 | 9/2019 | |

OTHER PUBLICATIONS

C. Unger, et al., "Characterization of the bending sensitivity of fibers by the MAC-value," Optics Communications vol. 107, pp. 361-364, May 1, 1994 (4 pages).

K. Kobayashi, et al., "Study of Microbendingloss in Thin Coated Fibers and Fiber Ribbons," IWCS, pp. 386-392, 1993 (8 pages).

K. Saitoh et al., "Full-Vectorial Imaginary-Distance Beam Propagation Method Based on a Finite Element Scheme: Application to Photonic Crystal Fibers," IEEE J. Quant. Elect. vol. 38, No. 7, pp. 927-933, Jul. 2007 (7 pages).

ITU-T G.650.1, "Definitions and test methods for linear, deterministic attributes of single-mode fibre and cable," (92 pages).

GR-20-CORE, "Generic Requirements for Optical Fiber and Optical Fiber Cable," Telecordia Technologies Generic Requirements, Issue 4, Jul. 2013 (184 pages).

Office Action issued in corresponding Taiwanese Application No. 110128117; dated Oct. 19, 2020 (3 pages).

International Search Report issued in corresponding International Application No. PCT/JP2021/025418; mailed Sep. 21, 2021 (3 pages).

* cited by examiner

OPTICAL FIBER CABLE

TECHNICAL FIELD

The present invention relates to an optical fiber cable.

BACKGROUND

In recent years, traffic of a communication infrastructure constructed by an optical fiber cable or the like has increased due to maturation of Fiber To The Home (FTTH) service, popularization of mobile terminals, expansion of use of cloud services, an increase in video traffic, and the like. Therefore, it is required to construct a communication infrastructure more economically and efficiently than before. Under such a background, there is a demand for increasing the number of mounting cores and mounting density of optical fibers mounted on the optical fiber cable. In general, in the optical fiber cable, a plurality of optical fibers are accommodated in a sheath that is a tubular resin member.

As means for increasing the number of mounting cores and the mounting density of the optical fibers accommodated in the sheath, it is conceivable to reduce the diameter of the optical fiber. However, in this case, the optical fiber is easily affected by a side pressure, and a micro-bend loss, which is an optical loss caused by so-called micro-bending in which the axis of the optical fiber is slightly bent, may increase. Patent Literature 1 below describes that a covering thickness of an optical fiber is reduced by adjusting an elastic modulus and a glass transition point of covering of the optical fiber, whereby a micro-bend loss can be suppressed even when the diameter of the optical fiber is reduced.

[Patent Literature 1] JP 2012-50895 A

Meanwhile, when the optical fiber cable is exposed to a low temperature environment, the sheath contracts at a low temperature, and the optical fiber is pressed and bent by the sheath that contracts at a low temperature. As result, a micro-bend loss occurs in the optical fiber, and a transmission loss of the optical fiber cable tends to increase. In particular, in a case where the optical fiber cable is configured using the optical fiber described in Patent Literature 1, since each optical fiber is thinner than a normal optical fiber, it is considered that the optical fiber is easily bent by a pressure from a sheath, and the transmission loss is easily increased.

One or more embodiments of the present invention provide an optical fiber cable capable of suppressing an increase in transmission loss in a low temperature environment.

SUMMARY

One or more embodiments of the present invention provide an optical fiber cable including: a plurality of optical fibers each including a glass portion including a core and a cladding surrounding the core, a primary covering layer covering the cladding, and a secondary covering layer covering the primary covering layer; and a sheath accommodating the plurality of optical fibers in an internal space, in which the optical fiber has a geometry micro-bend loss characteristic $F_{\mu BL\_G}$ ($Pa^{-1} \cdot m^{-10.5}$) of the optical fiber represented by $$F_{\mu BL\_G} = \frac{K_s^2}{H_f^2 \times D_o^{0.375} \times H_o^{0.625}}$$

-continued $$K_s = \frac{E_p d_f}{t_p},$$

$$H_f = \frac{\pi}{4} E_g \left(\frac{d_f}{2}\right)^4,$$

$$D_o = E_p + \left(\frac{t_s}{R_s \times 2}\right)^3 E_s,$$

$$H_o = \frac{\pi}{4} E_s (R_s^4 - R_p^4),$$

in which a flexural rigidity of the glass portion is $H_f$ ($Pa \cdot m^4$), a deformation resistance of the secondary covering layer is $D_0$ (Pa), a flexural rigidity of the secondary covering layer is $H_0$ ($Pa \cdot m^4$), a Young's modulus of the glass portion is $E_g$ (GPa), a Young's modulus of the primary covering layer is $E_p$ (MPa), a Young's modulus of the secondary covering layer is $E_s$ (MPa), an outer diameter of the glass portion is $d_f$ ($\mu m$), a radius of an outer circumferential surface of the primary covering layer is $R_p$ ($\mu m$), a radius of an outer circumferential surface of the secondary covering layer is $R_s$ ($\mu m$), a thickness of the primary covering layer is $t_p$ ($\mu m$), and a thickness of the secondary covering layer is $t_s$ ($\mu m$), and an optical micro-bend loss characteristic $F_{\mu BL\_O}$ (dB/turn) of the optical fiber represented by $$F_{\mu BL\_O} = \frac{2w}{\lambda_{cc}} \times \alpha_{BL},$$

in which a mode field diameter of light having a wavelength of 1310 nm propagating through the optical fiber is $2w$ ($\mu m$), a cable cutoff wavelength of the optical fiber is $\lambda_{cc}$ ($\mu m$), and a macro-bend loss with a radius of 10 mm of light having a wavelength of 1625 nm of the optical fiber is $\alpha_{BL}$ (dB/turn), and in a case where a cable characteristic Dc of the optical fiber cable is defined by $$Dc = (0.5-a)^2/b$$

using a porosity a of the internal space and the number b of cores of the optical fibers accommodated in the internal space, a value of a micro-bend loss characteristic factor $F_{\mu BL\_GO}$ represented by the following formula is $5.2 \times 10^{23}$ or less.

$$F_{\mu BL\_GO} = F_{\mu BL\_G} \times F_{\mu BL\_O} \times Dc$$

As described in Non-Patent Literature 1 (J. Baldauf, et al., "Relationship of Mechanical Characteristics of Dual Coated Single Mode Optical Fibers and Microbending loss," IEICE Trans. Commun., vol. E76-B, No. 4, 1993), Non-Patent Literature 2 (C. Unger, et al., "Characterization of the bending sensitivity of fibers by the MAC-value," Optics Communications vol. 107, no. 5-6, pp. 361-364, 1994), the micro-bend loss of the optical fiber tends to be affected by both a geometry and optical characteristic of the optical fiber.

Here, the geometry of the optical fiber is a parameter related to the structure of the optical fiber. In one or more embodiments of the present invention, the geometry of the optical fiber refers to the flexural rigidity $H_f$ of the glass portion, the deformation resistance $D_0$ of the secondary covering layer, the flexural rigidity $H_0$ of the secondary covering layer, the Young's modulus $E_g$ of the glass portion, the Young's modulus $E_p$ of the primary covering layer, the Young's modulus $E_s$ of the secondary covering layer, the cuter diameter $d_f$ (a diameter of the glass portion) of the glass portion, the radius $R_g$ of the glass portion, the radius $R_p$ of the primary covering layer, the radius $R_s$ of the secondary covering layer, the thickness $t_p$ of the primary covering layer, and the thickness $t_s$ of the secondary covering layer in the optical fiber.

In addition, the optical characteristics of the optical fiber are parameters related to characteristics of light propagating through the optical fiber, and in one or more embodiments of the present invention, the optical characteristics refer to the mode field diameter 2w of light propagating through the optical fiber, the cutoff wavelength $\lambda_{cc}$ of the optical fiber, and the macro-bend loss $\alpha_{BL}$ of the optical fiber. The macro-bend loss is also referred to as a bending loss.

In addition, when the optical fiber cable is exposed to a low temperature environment, as described above, the optical fiber is bent to cause the micro-bend loss, and a transmission loss tends to increase. Therefore, in consideration of such an increase in transmission loss, in the optical fiber cable, it may be required to set an increment of the transmission loss based on room temperature at −40° C. to 0.15 dB/km or less. Such an increment of the transmission loss may be referred to as a temperature characteristic test loss increment.

One or more embodiments of the present invention relate to the transmission loss of the optical fiber cable. The value of the micro-bend loss characteristic factor $F_{\mu BL\_GO}$ represented by the above formula is in a substantially direct proportional relationship with a value of the temperature characteristic test loss increment.

In addition, in a case where the value of the micro-bend loss characteristic factor is $5.2 \times 10^{23}$, the value of the temperature characteristic test loss increment becomes a value slightly smaller than 0.15 dB/km. As described above, the value of the micro-bend loss characteristic factor and the value of the temperature characteristic test loss increment have a substantially direct proportional relationship. Therefore, as the value of the micro-bend loss characteristic factor of the optical fiber cable is set to $5.2 \times 10^{23}$ or less, it is possible to suppress an increase in transmission loss in such a way that the increment of the transmission loss becomes 0.15 dB/km or less under a low temperature environment of −40° C. As described above, with such an optical fiber cable, it is possible to suppress an increase in transmission loss in a low temperature environment.

The value of the micro-bend loss characteristic factor $F_{\mu BL\_GO}$ may be $4.0 \times 10^2$ or less.

As the value of the micro-bend loss characteristic factor $F_{\mu BL\_GO}$ is set as above, the value of the temperature characteristic test loss increment, which is the increment of the transmission loss, can be set to 0.12 dB/km or less.

Further, the value of the micro-bend loss characteristic factor $F_{\mu BL\_GO}$ may be $3.2 \times 10^{23}$ or less.

As the value of the micro-bend loss characteristic factor $F_{\mu BL\_GO}$ is set as above, the value of the temperature characteristic test loss increment, which is the increment of the transmission loss, can be set to 0.10 dB/km or less.

As described above, according to one or more embodiments of the present invention, an optical fiber cable capable of suppressing an increase in transmission loss in a low temperature environment is provided.

DETAILED DESCRIPTION

Hereinafter, modes for implementing an optical fiber cable according to one or more embodiments of the present invention will be exemplified with reference to the accompanying drawings. Embodiments exemplified below are intended to facilitate understanding of the present invention and are not intended to limit the present invention. The present invention can be changed and modified from the following embodiments without departing from the gist of the present invention. In addition, in the present specification, dimensions of each member may be exaggerated for easy understanding.

Figure 1:
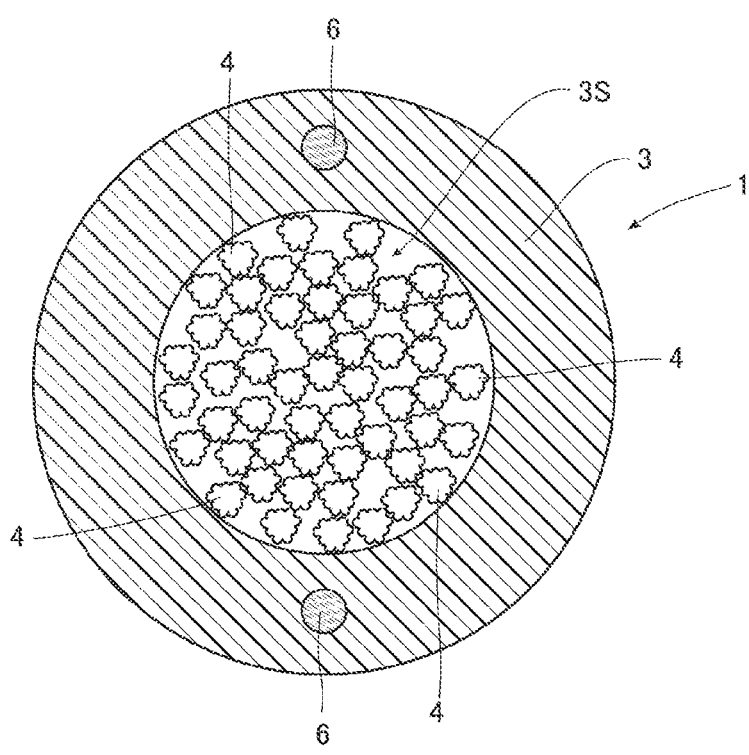
FIG. 1 is a view schematically illustrating a structure of a cross section of an optical fiber cable that is perpendicular to a longitudinal direction according to one or more embodiments of the present invention.

FIG. 1 is a view schematically illustrating a structure of a cross section of an optical fiber cable 1 that is perpendicular to a longitudinal direction according to one or more embodiments. As illustrated in FIG. 1, the optical fiber cable 1 includes a sheath 3, a plurality of ribbons 4, and a strength member 6 as main components.

The sheath 3 is a tubular member, and is formed of, for example, a thermoplastic resin such as polyethylene. The plurality of ribbons 4 are accommodated in an internal space 3S surrounded by the sheath 3. As described above, the optical fiber cable 1 of one or more embodiments is configured as a so-called ultra-high density cable (UHDC) in which the plurality of ribbons 4 are densely accommodated in the internal space 3S of the sheath 3. In one or more embodiments, the plurality of ribbons 4 have the same configuration.

In one or more embodiments, a pair of strength members 6 is embedded in a thick portion of the sheath 3. In the cross-sectional view of FIG. 1, the strength members 6 are provided at positions facing each other across the center of the optical fiber cable 1. Such a strength member 6 can prevent the ribbon 4 from extending more than necessary when tension acts in a longitudinal direction of the ribbon 4. Note that the positions and the number of the strength members 6 are not limited to those in this example, and the strength member 6 does not have to be provided.

Figure 2:
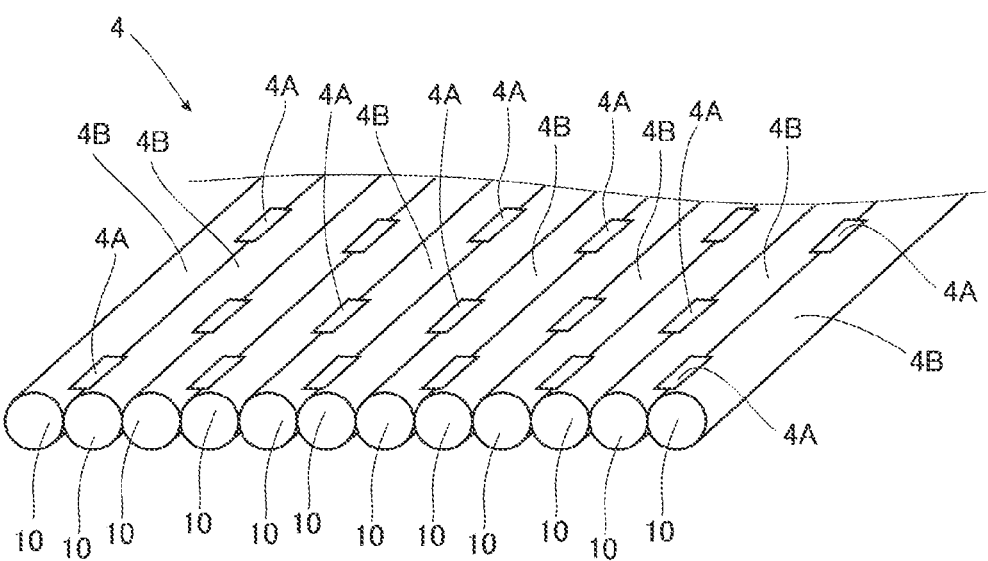
FIG. 2 is a perspective view schematically illustrating an example of an optical fiber ribbon included in the optical fiber cable illustrated in FIG. 1.

FIG. 2 is a perspective view schematically illustrating an example of the ribbon 4. As illustrated in FIG. 2, the ribbon 4 of one or more embodiments is a so-called intermittent bonding type ribbon. In the ribbon 4 of one or more embodiments, the plurality of optical fibers are arranged in a direction perpendicular to the longitudinal direction, and the arranged optical fibers 10 are bonded to each other. In the example of FIG. 2, the number of cores of the optical fibers 10 included in the ribbon 4 is 12. The number of cores of the optical fibers included in the ribbon 4 is not limited to 12, and may be more than 12 or less than 12. The ribbon 4 is not limited to the intermittent bonding type.

The ribbon 4 includes a bonding portion 4A and a single core portion 4B. The bonding portion 4A is formed of, for example, a UV curable resin or a thermosetting resin, and is bonded to the optical fibers 10 adjacent to each other to connect the optical fibers 10. The bonding portions 4A are intermittently provided at a constant pitch in the longitudinal direction. The single core portion 4B is a portion positioned between the bonding portions 4A and is a portion where the optical fibers 10 are not bonded to each other. With such a configuration, the ribbon 4 can be easily deformed and can be twisted or bundled in a substantially cylindrical shape, for example. FIG. 1 schematically illustrates a state in which the ribbons 4 are bundled in a substantially cylindrical shape.

A porosity a of the internal space 3S can be determined as follows, in which a volume of the internal space 3S of the sheath 3 is A, and the sum of volumes of various members accommodated in the internal space 3S is B.

$$a=(A-B)/A$$

The smaller the porosity a is, the more densely the optical fibers 10 are arranged. In one or more embodiments, as illustrated in FIG. 1, the members accommodated in the internal space 3S are the plurality of ribbons 4. Therefore, the value of B corresponds to the sum of the volumes of the plurality of ribbons 4 in the internal space 3S. In one or more embodiments, as described above, the plurality of ribbons 4 have substantially the same volume because of the same configuration. Therefore, the value of B can be expressed as c×V, in which the volume is V and the number of ribbons 4 accommodated in the internal space 3S is c.

The value of the porosity a is not particularly limited. However, in a case where the porosity a is excessively small, the density of the optical fibers becomes excessively high, and a side pressure applied by the adjacent optical fibers 10 to each other increases, which may lead to an increase in micro-bend loss. Therefore, in consideration of increasing the number of cores of the optical fiber 10 in the optical fiber cable 1 and suppressing the side pressure, the porosity a may be, for example, 0.31 or more and 0.42 or less.

Figure 3:
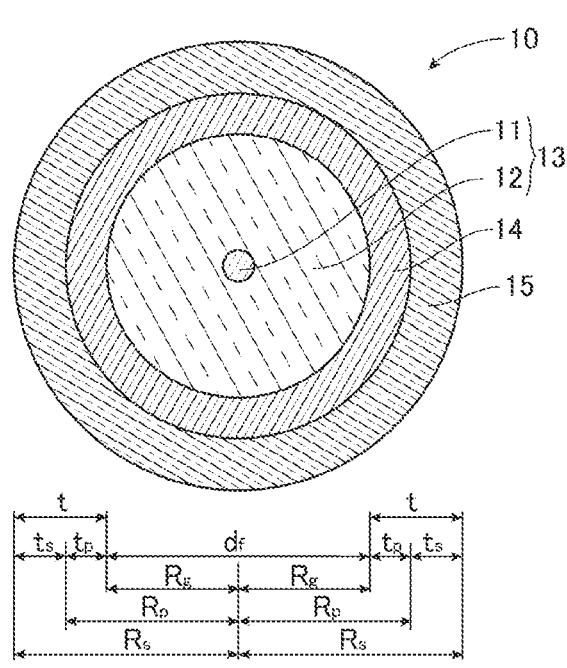
FIG. 3 is a view schematically illustrating a structure of a cross section of the optical fiber that is perpendicular to the longitudinal direction, the optical fiber being included in the optical fiber ribbon illustrated in FIG. 2.

FIG. 3 is a view schematically illustrating a structure of a cross section of the optical fiber 10 that is perpendicular to the longitudinal direction, the optical fiber 10 being included in the ribbon 4. The optical fiber according to one or more embodiments is a single mode optical fiber. As illustrated in FIG. 3, the optical fiber mainly includes a core 11, a cladding 12 surrounding the core 11 without a gap, a primary covering layer 14 covering the cladding 12, and a secondary covering layer 15 covering the primary covering layer 14. In the optical fiber 10, the cladding 12 has a refractive index lower than that of the core 11.

The core 11 may be formed of pure quartz to which a dopant is not added, or may be formed of quartz to which germanium (Ge) or the like that increases the refractive index is added as a dopant.

As described above, the cladding 12 has a refractive index lower than that of the core 11. For example, in a case where the core 11 is formed of pure quartz, the cladding 12 may be formed of quartz to which fluorine (F), boron (B), or the like that decreases the refractive index is added as a dopant, and in a case where the core 11 is formed of quartz to which germanium (Ge) or the like that increases the refractive index is added as a dopant, the cladding 12 may be formed of pure quartz to which no dopant is added. The cladding 12 may be formed of quartz added with chlorine ($Cl_2$). Further, the cladding 12 may be a single layer, may be formed of a plurality of layers having different refractive indexes, or may be a hole assisted type.

As described above, both the core 11 and the cladding 12 are formed of quartz (glass). Therefore, when the core 11 and the cladding 12 are collectively referred to as a glass portion 13, the glass portion 13 includes the core 11 and the cladding 12, and the glass portion 13 is covered with the primary covering layer 14. The glass portion 13 is also referred to as a bare optical fiber. An outer diameter (diameter) $d_f$ of the glass portion 13 of one or more embodiments is smaller than approximately 125 μm, which is an outer diameter of a glass portion of a general optical fiber, and may be, for example, 80 μm or more and 90 μm or less.

The primary covering layer 14 is formed of, for example, an ultraviolet curable resin or a thermosetting resin, and is formed to have a thickness $t_p$ (μm) outside the glass portion 13. In one or more embodiments, a Young's modulus $E_g$ of the primary covering layer 14 is lower than a Young's modulus $E_s$ of the secondary covering layer 15. Since the primary covering layer 14 that is in direct contact with the glass portion has a low Young's modulus as described above, the primary covering layer 14 acts as a buffer material to reduce an external force ac ting on the glass portion 13. An outer diameter of the primary covering layer 14 is represented by $2R_p$, in which a radius of an outer circumferential surface of the primary covering layer 14 is $R_p$ (μm), and the thickness $t_p$ of the primary covering layer 14 is represented by the following formula, in which a radius ($d_f$×½) of the glass portion is $R_g$ (μm).

$$t_p=R_p-R_g$$

In one or more embodiments, the secondary covering layer 15 is the outermost layer of the optical fiber 10, and is formed of, for example, an ultraviolet curable resin or a thermosetting resin of a type different from the resin forming the primary covering layer 14, and is formed to have a thickness $t_s$ (μm) outside the primary covering layer 14. For example, in a case where the primary covering layer 14 is formed of an ultraviolet curable resin, the secondary covering layer 15 may be formed of an ultraviolet curable resin different from the ultraviolet curable resin forming the primary covering layer 14, and in a case where the primary covering layer 14 is formed of a thermosetting resin, the secondary covering layer may be formed of a thermosetting resin different from that of the primary covering layer 14. In one or more embodiments, the Young's modulus $E_s$ of the secondary covering layer 15 is higher than the Young's modulus $E_g$ or the primary covering layer 14. As described above, since the secondary covering layer 15 forming the outermost layer of the optical fiber 10 has a high. Young's modulus, the glass portion 13 can be appropriately protected from an external force. An outer diameter of the secondary covering layer 15, that is, an outer diameter of the optical fiber 10 is represented by $2R_s$, in which a radius of an outer circumferential surface of the secondary covering layer 15 is $R_s$, and the thickness $t_s$ of the secondary covering layer 15 is represented by the following formula.

$$t_s=R_s-R_p$$

Note that the outer diameter of the optical fiber used for the optical fiber cable is generally about 240 μm to 250 μm. However, in one or more embodiments, the outer diameter of the secondary covering layer 15 may be, for example, 150 μm or more and 161 μm or less.

In addition, the sum of the thickness $t_p$ of the primary covering layer 14 and the thickness $t_s$ of the secondary covering layer 15 is a covering thickness t, and in this case, the covering thickness of the optical fiber used for the optical fiber cable is generally about 60 μm. However, in one or more embodiments, the covering thickness t of the optical fiber 10 may be, for example, 35.0 μm or more and 37.5 μm or less.

As described above, the ribbons 4 each formed by bundling 12 optical fibers 10 having such a small diameter are densely accommodated in the internal space 3S of the sheath 3 of the optical fiber cable 1. In this way, for example, the optical fiber cable 1 including 288, 1728, or 2000 or more optical fibers is configured. Since the optical fiber 10 of one or more embodiments is reduced in diameter as described above, dimensions of the ribbon 4 can be made smaller than dimensions of a general ribbon. Therefore, the number of cores of the optical fibers accommodated in the internal space 3S of the sheath 3 can be effectively increased. Alternatively, as the ribbon 4 having such a small dimension is accommodated in the internal space 3S, the dimension of the optical fiber cable 1 can be reduced.

When the optical fiber cable is exposed to a low temperature environment such as −40° C., the sheath contracts at a low temperature, and the optical fiber is pressed and bent by the sheath that contracts at a low temperature. As a result, a micro-bend loss occurs in the optical fiber, and a transmission loss of the optical fiber cable tends to increase. In particular, since the optical fiber having a reduced diameter is thinner than a normal optical fiber, it is considered that the optical fiber is easily bent by a pressure from the sheath. Therefore, when the optical fiber with a reduced diameter is exposed to a low temperature environment, it is considered that an increase in transmission loss becomes larger than that of a normal optical fiber. In general, the resin forming the sheath tends to contract more at a lower temperature. Therefore, it is considered that the lower the temperature of the environment in which the optical fiber cable is used, the larger the pressure applied to the optical fiber from the sheath, and as a result, the increase in transmission loss of the optical fiber cable also increases.

However, the optical fiber cable 1 of one or more embodiments is formed in such a way that a value of a macro-bend loss characteristic factor $F_{\mu BL\_GO}$ to be described later is $5.2 \times 10^{23}$ or less. Therefore, even when the optical fiber cable 1 is exposed to a low temperature environment such as −40° C., for example, an increase in transmission loss can be suppressed. Hereinafter, the reason for this will be described in detail.

The micro-bend loss of the optical fiber tends to be affected by both the geometry and the optical characteristic of the optical fiber as described in Non-Patent Literatures 1 and 2 described above.

The geometry of the optical fiber is a parameter related to the structure of the optical fiber. In one or more embodiments, the geometry of the optical fiber refers to a flexural rigidity $H_f$ of the glass portion, a deformation resistance $D_0$ of the secondary covering layer, a flexural rigidity $H_0$ of the secondary covering layer, a Young's modulus $E_g$ of the glass portion, a Young's modulus $E_p$ of the primary covering layer, a Young's modulus $E_s$ of the secondary covering layer, an outer diameter $d_f$ (a diameter of the glass portion) of the glass portion, a radius $R_g$ of the glass portion, a radius $R_p$ of the primary covering layer, a radius $R_s$ of the secondary covering layer, a thickness $t_p$ of the primary covering layer, and a thickness $t_s$ of the secondary covering layer in the optical fiber.

In addition, the optical characteristics of the optical fiber are parameters related to characteristics of light propagating through the optical fiber, and in one or more embodiments, the optical characteristics refer to the mode field diameter 2w of light propagating through the optical fiber, the cutoff wavelength $\lambda_{cc}$ of the optical fiber, and the macro-bend loss $\alpha_{BL}$ of the optical fiber.

In addition, as described above, when the optical fiber cable is exposed to a low temperature environment, the micro-bend loss occurs in the optical fiber, and the transmission loss tends to increase. Therefore, in the optical fiber cable, in consideration of such an increase in transmission loss, it may be required to set an increment of the transmission loss based on room temperature at −40° C. to 0.15 dB/km or less. Such an increment of the transmission loss can be obtained by, for example, a cable temperature characteristic test defined in GR-20, Issue 4, July 2013 "Generic Requirements for Optical Fiber and Optical Fiber Cable", and is sometimes referred to as a temperature characteristic test loss increment.

One or more embodiments of the present invention relate to the transmission loss of the optical fiber cable The value of the macro-bend loss characteristic factor $F_{\mu BL\_GO}$ represented by the following Formula (4)

$$F_{\mu BL\_GO} = F_{\mu BL\_G} \times F_{\mu BL\_O} \times Dc \tag{4}$$

is in a substantially direct proportional relationship with the value of the temperature characteristic test loss increment, by a geometry micro-bend loss characteristics of the optical fiber 10 represented by the following Formula (1)

$$F_{\mu BL\_G} = \frac{K_s^2}{H_f^2 \times D_o^{1.125-0.25\mu} \times H_o^{(2\mu-1)/8}} \tag{1}$$

$$K_s = \frac{E_p d_f}{t_p},$$

$$H_f = \frac{\pi}{4} E_g \left( \frac{d_f}{2} \right)^4,$$

$$D_o = E_p + \left( \frac{t_s}{R_s \times 2} \right)^3 E_s,$$

$$H_o = \frac{\pi}{4} E_s \left( R_s^4 - R_p^4 \right),$$

using the parameters related to the geometry described above, an optical micro-bend loss characteristic $F_{\mu BL\_O}$ of the optical fiber 10 represented by the following Formula (2)

$$F_{\mu BL\_O} = \frac{2w}{\lambda_{cc}} \times \alpha_{BL} \tag{2}$$

using the parameters related to the optical characteristic described above, and a cable characteristic Dc of the optical fiber cable 1 represented by the following Formula (3)

$$Dc = (0.5 - a)^2 / b \tag{3}$$

using the porosity a and the number b of cores of the optical fiber 10 accommodated in the internal space 3S of the sheath 3.

According to Non-Patent Literature 3 (K. Kobayashi, et al., "Study of Microbending loss in thin coated fibers and fiber ribbons," IWCS, pp. 386-392, 1993), a typical value of the constant μ in Formula (1) is "3". Therefore, Formula (1) becomes the following Formula (5).

$$F_{\mu BL\_G} = \frac{K_s^2}{H_f^2 \times D_o^{0.375} \times H_o^{0.625}} \tag{5}$$

-continued $$K_s = \frac{E_p d_f}{t_p},$$

$$H_f = \frac{\pi}{4} E_g \left(\frac{d_f}{2}\right)^4,$$

$$D_o = E_p + \left(\frac{t_s}{R_s \times 2}\right)^3 E_s,$$

$$H_o = \frac{\pi}{4} E_s \left(R_s^4 - R_p^4\right),$$

In addition, in a case where the value of the micro-bend loss characteristic factor is 5.2×10²³, the temperature characteristic test loss increment has a value slightly smaller than 0.15 dB/km. As described above, the value of the micro-bend loss characteristic factor and the value of the temperature characteristic test loss increment have a substantially direct proportional relationship. Therefore, as the value of the micro-bend loss characteristic factor of the optical fiber is set to 5.2×10²³ or less, it is possible to suppress an increase in transmission loss in such a way that the increment of the transmission loss becomes 0.15 dB/km or less under a low temperature environment of −40° C.

Next, the fact that the value of the temperature characteristic test loss increment becomes a value slightly smaller than 0.15 dB/km in a case where the value of the micro-bend loss characteristic factor is 5.2×10²³ will be described in detail.

The following experiment were conducted in order to verify a relationship between the value of the micro-bend loss characteristic factor $F_{\mu BL\_GO}$ and the value of the temperature characteristic test loss increment. Note that the one or more embodiments of the present invention are not limited to the experiment.

Optical fiber cables of Samples 1 to 20 were prepared. Each of Samples 1 to 20 is a so-called ultra-high density cable in which the ribbons 4 each including 12 core optical fiber 10 illustrated in FIG. 2 are accommodated in the internal space 3S. Specifications of parameters of Samples 1 to 20 are shown in Tables 1 to 4 below. In Tables 1 to 4, parameters excluding the porosity, the number of cores, the micro-bend loss characteristic factor $F_{\mu BL\_GO}$, and the temperature characteristic test loss increment are parameters indicating individual specifications of the plurality of optical fibers included in Samples 1 to 20. For example, the optical fiber cable of Sample 1 shown in Table 1 includes 288 optical fibers having the same specification, and includes 24 (288/12) ribbons 4. In addition, for example, the optical fiber cable of Sample 11 shown in Table 3 includes 1728 optical fibers having the same specification, and includes 144 (1728/12) ribbons 4. The sheath 3 of each of Samples 1 to 20 has the same configuration.

TABLE 1

| Sample NO. | 1 | 2 | 3 | 4 | 5 |
|---|---|---|---|---|---|
| Outer diameter of glass portion(μm) | 80.0 | 80.0 | 80.0 | 80.0 | 80.0 |
| Outer diameter of primary covering layer(μm) | 115.0 | 115.0 | 115.0 | 115.0 | 115.0 |
| Outer diameter of secondary covering layer(μm) | 153.0 | 153.0 | 153.0 | 153.0 | 153.0 |
| Young's modulus of glass portion(GPa) | 74.0 | 74.0 | 74.0 | 74.0 | 74.0 |
| Young's modulus of primary covering leyer(MPa) | 0.15 | 0.15 | 0.17 | 0.15 | 0.15 |
| Young's modulus of secondary covering layer(MPa) | 1751 | 1724 | 1242 | 1751 | 1761 |
| Thickness of primary covering layer(μm) | 17.5 | 17.5 | 17.5 | 17.5 | 17.5 |
| Thickness of secondary covering layer(μm) | 19.0 | 19.0 | 19.0 | 19.0 | 19.0 |
| Covering thickness(μm) | 36.5 | 36.5 | 36.5 | 36.5 | 36.5 |
| Flexural rigidity of glass portion(Pa · m⁴) | $1.49 \times 10^{-7}$ | $1.49 \times 10^{-7}$ | $1.49 \times 10^{-7}$ | $1.49 \times 10^{-7}$ | $1.49 \times 10^{-7}$ |
| Flexural rigidity of secondary covering layer(Pa · m⁴) | $3.21 \times 10^{-8}$ | $3.16 \times 10^{-8}$ | $2.28 \times 10^{-8}$ | $3.21 \times 10^{-8}$ | $3.22 \times 10^{-8}$ |
| κ s(Pa) | $7.0 \times 10^5$ | $6.9 \times 10^5$ | $7.8 \times 10^5$ | $7.0 \times 10^5$ | $6.8 \times 10^5$ |
| Deformation resistance of secondary covering layer(Pa) | $3.5 \times 10^6$ | $3.5 \times 10^6$ | $2.6 \times 10^6$ | $3.5 \times 10^6$ | $3.5 \times 10^6$ |
| μ (a.u.) | 3 | 3 | 3 | 3 | 3 |
| F μ BL_G(Pa⁻¹ · m⁻¹⁰·⁵) | $3.8 \times 10^{27}$ | $3.7 \times 10^{27}$ | $6.6 \times 10^{27}$ | $3.8 \times 10^{27}$ | $3.5 \times 10^{27}$ |
| Mode field diameter(μm) | 8.6 | 7.7 | 8.3 | 8.6 | 8.7 |
| Cable cutoff wavelength(μm) | 1.2 | 1.2 | 1.2 | 1.2 | 1.2 |
| MAC value | 7.08 | 6.51 | 7.05 | 7.08 | 7.03 |
| Macro-bend loss(dB/turn) | 0.17 | 0.08 | 0.06 | 0.17 | 0.03 |
| Propagation constant difference(rad/m) | $1.16 \times 10^4$ | $1.25 \times 10^4$ | $1.53 \times 10^4$ | $1.16 \times 10^4$ | $1.32 \times 10^4$ |
| F μ BL_O(dB/turn) | $1.24 \times 10^0$ | $5.16 \times 10^{-1}$ | $4.03 \times 10^{-1}$ | $1.24 \times 10^0$ | $1.97 \times 10^{-1}$ |
| Porosity | 0.31 | 0.31 | 0.31 | 0.42 | 0.42 |
| Number of cores | 288 | 288 | 288 | 288 | 288 |
| F μ BL_GO | $6.2 \times 10^{23}$ | $2.5 \times 10^{23}$ | $3.5 \times 10^{23}$ | $1.2 \times 10^{23}$ | $1.7 \times 10^{22}$ |
| Temperature characteristic test loss increment(dB/km) | 0.18 | 0.06 | 0.11 | 0.06 | 0.02 |

TABLE 2

| Sample NO. | 6 | 7 | 8 | 9 | 10 |
|---|---|---|---|---|---|
| Outer diameter of glass portion(μm) | 80.0 | 80.0 | 80.0 | 80.0 | 90.0 |
| Outer diameter of primary covering layer(μm) | 115.0 | 115.0 | 115.0 | 115.0 | 122.0 |
| Outer diameter of secondary covering layer(μm) | 153.0 | 153.0 | 153.0 | 153.0 | 161.0 |
| Young's modulus of glass portion(GPa) | 74.0 | 74.0 | 74.0 | 74.0 | 74.0 |
| Young's modulus of primary covering layer(MPa) | 0.15 | 0.15 | 0.17 | 0.14 | 0.22 |
| Young's modulus of secondary covering layer(MPa) | 1724 | 1711 | 1242 | 1143 | 1254 |
| Thickness of primary covering layer(μm) | 17.5 | 17.5 | 17.5 | 17.5 | 16.0 |
| Thickness of secondary covering layer(μm) | 19.0 | 19.0 | 19.0 | 19.0 | 19.5 |
| Covering thickness(μm) | 36.5 | 36.5 | 36.5 | 36.5 | 35.5 |
| Flexural rigidity of glass portion(Pa · m⁴) | $1.49 \times 10^{-7}$ | $1.49 \times 10^{-7}$ | $1.49 \times 10^{-7}$ | $1.49 \times 10^{-7}$ | $2.38 \times 10^{-7}$ |

TABLE 2-continued

| Sample NO. | 6 | 7 | 8 | 9 | 10 |
|---|---|---|---|---|---|
| Flexural rigidity of secondary covering layer(Pa · m$^4$) | $3.16 \times 10^{-9}$ | $3.13 \times 10^{-8}$ | $2.28 \times 10^{-8}$ | $2.09 \times 10^{-8}$ | $2.77 \times 10^{-8}$ |
| κ s(Pa) | $6.9 \times 10^5$ | $7.1 \times 10^5$ | $7.8 \times 10^5$ | $6.5 \times 10^5$ | $1.2 \times 10^6$ |
| Deformation resistance of secondary covering layer(Pa) | $3.5 \times 10^6$ | $3.4 \times 10^6$ | $2.6 \times 10^6$ | $2.3 \times 10^6$ | $2.4 \times 10^6$ |
| μ (a.u.) | 3 | 3 | 3 | 3 | 3 |
| F μ BL_G(Pa$^{-1}$ · m$^{-10.5}$) | $3.7 \times 10^{27}$ | $3.9 \times 10^{27}$ | $6.6 \times 10^{27}$ | $5.0 \times 10^{27}$ | $5.7 \times 10^{27}$ |
| Mode field diameter(μm) | 7.7 | 8.4 | 8.3 | 8.6 | 8.4 |
| Cable cutoff wavelength(μm) | 1.2 | 1.2 | 1.2 | 1.2 | 1.2 |
| MAC value | 6.51 | 7.07 | 7.05 | 7.00 | 6.86 |
| Macro-bend loss(dB/turn) | 0.08 | 0.09 | 0.06 | 0.03 | 0.08 |
| Propagation constant difference(rad/m) | $1.25 \times 10^4$ | $1.53 \times 10^4$ | $1.53 \times 10^4$ | $1.32 \times 10^4$ | $1.35 \times 10^4$ |
| F μ BL_O(dB/turn) | $5.16 \times 10^{-1}$ | $6.10 \times 10^{-1}$ | $4.03 \times 10^{-1}$ | $1.77 \times 10^{-1}$ | $5.70 \times 10^{-1}$ |
| Porosity | 0.42 | 0.42 | 0.42 | 0.42 | 0.42 |
| Number of cores | 288 | 288 | 288 | 288 | 288 |
| F μ BL_GO | $4.8 \times 10^{22}$ | $6.0 \times 10^{22}$ | $6.6 \times 10^{22}$ | $2.2 \times 10^{22}$ | $7.6 \times 10^{22}$ |
| Temperature characteristic test loss increment(dB/km) | 0.04 | 0.04 | 0.04 | 0.05 | 0.04 |

TABLE 3

| Sample NO. | 11 | 12 | 13 | 14 | 15 |
|---|---|---|---|---|---|
| Outer diameter of glass portion(μm) | 80.4 | 81.1 | 81.0 | 81.0 | 80.2 |
| Outer diameter of primary covering layer(μm) | 115.5 | 115.9 | 109.8 | 119.1 | 114.1 |
| Outer diameter of secondary covering layer(μm) | 152.5 | 153.2 | 152.5 | 152.1 | 150.8 |
| Young's modulus of glass portion(GPa) | 74.0 | 74.0 | 74.0 | 74.0 | 74.0 |
| Young's modulus of primary covering layer(MPa) | 0.13 | 0.13 | 0.13 | 0.14 | 0.15 |
| Young's modulus of secondary covering layer(MPa) | 1249 | 1261 | 1231 | 1272 | 1252 |
| Thickness of primary covering layer(μm) | 17.6 | 17.4 | 14.3 | 19.1 | 17.0 |
| Thickness of secondary covering layer(μm) | 18.5 | 18.7 | 21.5 | 16.5 | 18.4 |
| Covering thickness(μm) | 36.1 | 36.1 | 35.8 | 35.6 | 35.3 |
| Flexural rigidity of glass portion(Pa · m$^4$) | $1.52 \times 10^{-7}$ | $1.57 \times 10^{-7}$ | $1.56 \times 10^{-7}$ | $1.56 \times 10^{-7}$ | $1.50 \times 10^{-7}$ |
| Flexural rigidity of secondary covering layer(Pa · m$^4$) | $2.22 \times 10^{-8}$ | $2.29 \times 10^{-8}$ | $2.40 \times 10^{-8}$ | $2.09 \times 10^{-8}$ | $2.14 \times 10^{-8}$ |
| κ s(Pa) | $6.2 \times 10^5$ | $6.2 \times 10^5$ | $7.5 \times 10^5$ | $6.0 \times 10^5$ | $7.2 \times 10^5$ |
| Deformation resistance of secondary covering layer(Pa) | $2.4 \times 10^6$ | $2.4 \times 10^6$ | $3.6 \times 10^6$ | $1.8 \times 10^6$ | $2.4 \times 10^6$ |
| μ (a.u.) | 3 | 3 | 3 | 3 | 3 |
| F μ BL_G(Pa$^{-1}$ · m$^{-10.5}$) | $4.1 \times 10^{27}$ | $3.7 \times 10^{27}$ | $4.7 \times 10^{27}$ | $4.2 \times 10^{27}$ | $5.7 \times 10^{27}$ |
| Mode field diameter(μm) | 8.6 | 7.6 | 8.3 | 8.3 | 8.3 |
| Cable cutoff wavelength(μm) | 1.2 | 1.3 | 1.2 | 1.2 | 1.2 |
| MAC value | 7.08 | 6.01 | 6.98 | 6.98 | 6.98 |
| Macro-bend loss(dB/turn) | 0.05 | 0.01 | 0.13 | 0.13 | 0.13 |
| Propagation constant difference(rad/m) | $1.32 \times 10^4$ | $1.45 \times 10^4$ | $1.10 \times 10^4$ | $1.13 \times 10^4$ | $1.13 \times 10^4$ |
| F μ BL_O(dB/turn) | $3.48 \times 10^{-1}$ | $7.87 \times 10^{-2}$ | $9.16 \times 10^{-1}$ | $9.22 \times 10^{-1}$ | $9.18 \times 10^{-1}$ |
| Porosity | 0.42 | 0.42 | 0.42 | 0.42 | 0.42 |
| Number of cores | 1728 | 1728 | 1728 | 1728 | 1728 |
| F μ BL_GO | $5.0 \times 10^{21}$ | $1.0 \times 10^{21}$ | $1.5 \times 10^{22}$ | $1.4 \times 10^{22}$ | $1.9 \times 10^{22}$ |
| Temperature characteristic test loss increment(dB/km) | 0.02 | 0.01 | 0.03 | 0.00 | 0.04 |

45

TABLE 4

| Sample NO. | 16 | 17 | 18 | 19 | 20 |
|---|---|---|---|---|---|
| Outer diameter of glass portion(μm) | 81.0 | 80.8 | 80.0 | 81.1 | 80.5 |
| Outer diameter of primary covering layer(μm) | 113.3 | 114.2 | 114.6 | 114.6 | 114.7 |
| Outer diameter of secondary covering layer(μm) | 151.0 | 153.6 | 151.4 | 152.8 | 151.0 |
| Young's modulus of glass portion(GPa) | 74.0 | 74.0 | 74.0 | 74.0 | 74.0 |
| Young's modulus of primary covering layer(MPa) | 0.15 | 0.14 | 0.22 | 0.18 | 0.19 |
| Young's modulus of secondary covering layer(MPa) | 1305 | 1332 | 1357 | 1279 | 1246 |
| Thickness of primary covering layer(μm) | 16.2 | 16.7 | 17.3 | 16.8 | 17.1 |
| Thickness of secondary covering layer(μm) | 18.9 | 19.7 | 18.4 | 19.1 | 18.2 |
| Covering thickness(μm) | 35.0 | 36.4 | 35.7 | 35.9 | 35.3 |
| Flexural rigidity of glass portion(Pa · m$^4$) | $1.56 \times 10^{-7}$ | $1.55 \times 10^{-7}$ | $1.49 \times 10^{-7}$ | $1.57 \times 10^{-7}$ | $1.53 \times 10^{-7}$ |
| Flexural rigidity of secondary covering layer(Pa · m$^4$) | $2.27 \times 10^{-8}$ | $2.53 \times 10^{-8}$ | $2.35 \times 10^{-8}$ | $2.34 \times 10^{-8}$ | $2.12 \times 10^{-8}$ |
| κ s(Pa) | $7.3 \times 10^5$ | $6.5 \times 10^5$ | $1.0 \times 10^6$ | $8.9 \times 10^5$ | $8.8 \times 10^5$ |
| Deformation resistance of secondary covering layer(Pa) | $2.7 \times 10^6$ | $2.9 \times 10^6$ | $2.7 \times 10^6$ | $2.7 \times 10^6$ | $2.4 \times 10^8$ |
| μ (a.u.) | 3 | 3 | 3 | 3 | 3 |
| F μ BL_G(Pa$^{-1}$ · m$^{-10.5}$) | $5.1 \times 10^{27}$ | $3.8 \times 10^{27}$ | $1.1 \times 10^{28}$ | $7.3 \times 10^{27}$ | $8.5 \times 10^{27}$ |
| Mode field diameter(μm) | 8.3 | 8.5 | 8.5 | 8.5 | 8.2 |
| Cable cutoff wavelength(μm) | 1.2 | 1.2 | 1.2 | 1.2 | 1.2 |
| MAC value | 6.98 | 7.23 | 7.07 | 7.07 | 6.99 |
| Macro-bend loss(dB/turn) | 0.13 | 0.10 | 0.13 | 0.13 | 0.08 |

TABLE 4-continued

| Sample NO. | 16 | 17 | 18 | 19 | 20 |
|---|---|---|---|---|---|
| Propagation constant difference(rad/m) | $1.13 \times 10^4$ | $1.12 \times 10^4$ | $1.15 \times 10^4$ | $1.15 \times 10^4$ | $1.11 \times 10^4$ |
| F μ BL_O(dB/turn) | $9.16 \times 10^{-1}$ | $7.47 \times 10^{-1}$ | $9.45 \times 10^{-1}$ | $9.45 \times 10^{-1}$ | $5.92 \times 10^{-1}$ |
| Porosity | 0.42 | 0.42 | 0.42 | 0.42 | 0.42 |
| Number of cores | 1728 | 1728 | 1728 | 1728 | 1728 |
| F μ BL_GO | $1.6 \times 10^{22}$ | $9.9 \times 10^{21}$ | $3.5 \times 10^{22}$ | $2.4 \times 10^{22}$ | $1.8 \times 10^{22}$ |
| Temperature characteristic test loss increment(dB/km) | 0.04 | 0.01 | 0.0 | 0.01 | 0.02 |

Among the parameters indicating the individual specifications of the optical fiber, the mode field diameter (MFD), the cutoff wavelength, the MAC value, the macro-bend loss, and the propagation constant difference are as follows.

The mode field diameter is a mode field diameter of light of the LP01 mode when the light having a wavelength of 1310 nm propagates through the optical fiber. The mode field diameter is represented by a definition formula (the following Formula (6)) of Petermann II in Recommendation ITU-T G.650.1. Here, E(r) represents an electric field intensity at a point where a distance from a central axis of the optical fiber is r.

$$MFD = 2w = 2 \sqrt{\frac{2 \int_0^\infty E^2(r)r\,dr}{\int_0^\infty [dE(r)/dr]^2 r\,dr}} \tag{6}$$

The cutoff wavelength indicates the minimum wavelength at which a higher mode is sufficiently attenuated. This higher mode refers to, for example, an LP11 mode. Specifically, the cutoff wavelength is the minimum wavelength at which a loss of the higher mode is 19.3 dB. The cutoff wavelength includes a fiber cutoff wavelength and a cable cutoff wavelength and can be measured by, for example, a measurement method described in Recommendation ITU-T G.650. The cable cutoff wavelength is described in Tables 1 to 4. Furthermore, the MAC value is a ratio between the mode field diameter of light having a wavelength of 1310 nm and the cable cutoff wavelength, and is defined as $2w/\lambda_{cc}$, in which the mode field diameter is 2w and the cable cutoff wavelength is $\lambda_{cc}$. The macro-bend loss is a bending loss caused when light having a wavelength of 1625 nm propagates through a bent portion when the optical fiber is bent at a radius of 10 mm. "/turn" in the unit of macro-bend loss means "per turn of the optical fiber". The propagation constant difference is a difference between the propagation constant in the guided mode of light having a wavelength of 1550 nm and the propagation constant in the radiation mode of light having a wavelength of 1550. In this experiment, the propagation constant difference is a difference between the propagation constant in the LP01 mode of light having a wavelength of 1550 nm and the propagation constant in the LP11 mode. The propagation constant was calculated using a two-dimensional finite element scheme described in Non-Patent Literature 4 (K. Saitoh and M. Koshiba, "Full-Vectorial Imaginary-Distance Beam Propagation Method Based on a Finite Element Scheme: Application to Photonic Crystal Fibers," IEEE J. Quant. Elect. vol. 38, pp. 927-933, 2002) based on a refractive index profile of the experimentally produced optical fiber.

The value of the micro-bend loss characteristic factor $F_{\mu BL\_GO}$ of each of the optical fiber cables of Samples 1 to 20 were obtained by putting the values of the parameters described in Tables 1 to 4 into Formulae (2) to (5).

The temperature characteristic test loss increment of each of the optical fiber cables of Sample 1 to 20 was obtained by the cable temperature characteristic test defined in GR-20, Issue 4, July 2013 "Generic Requirements for Optical Fiber and Optical Fiber Cable" as described above. Specifically, a cable having a total length of 1 km was wound around a drum, the drum was placed in a thermostatic bath at room temperature, and then 3 m of each of one end and the other end of the cable was taken out from the thermostatic bath and connected to an optical time domain reflectometer (OTDR). As the drum, a drum having a drum diameter with which the overlap of the wound cable form seven layers or less was selected. In the cable temperature characteristic test, it is known that the drum diameter hardly affects the measured value. Therefore, it is also possible to use a drum having a drum diameter different from that described above. Next, a value of a transmission loss of light having a wavelength of 1625 nm propagating through the cable in a state where the thermostatic bath was at room temperature was measured. Thereafter, the temperature of the thermostatic bath was lowered over 1.5 hours or more, it was confirmed that the temperature reached −40° C., the temperature of −40° C. was maintained for 12 hours, and then the value of the transmission loss of the light having the wavelength of 1625 nm propagating through the cable was measured. A difference between the value of the transmission loss and a value of a transmission loss measured at a normal temperature was obtained, and the difference was defined as the temperature characteristic test loss increment.

Figure 4:
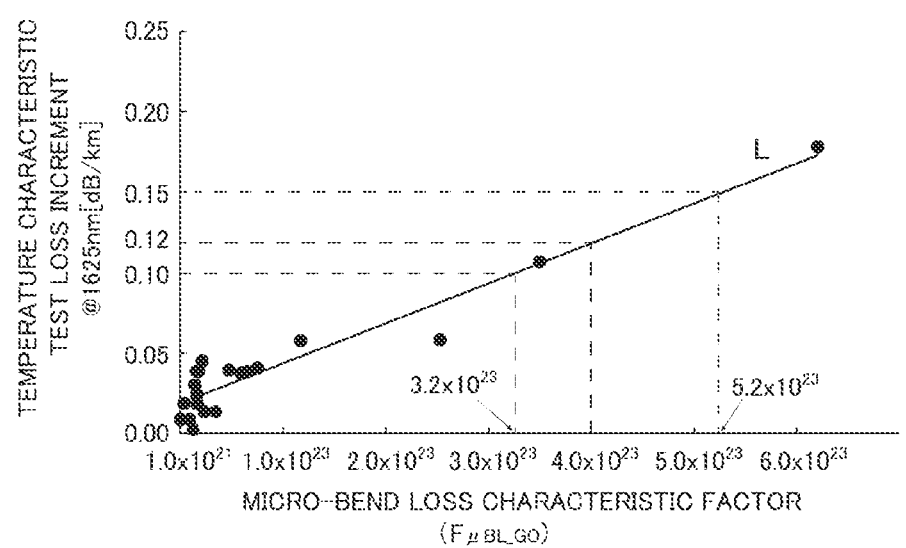
FIG. 4 is a diagram illustrating a relationship between a value of a micro-bend loss characteristic factor and a temperature characteristic test loss increment in the optical fiber cable.

The value of the macro-bend loss characteristic factor $F_{\mu BL\_GO}$ and the value of the temperature characteristic test loss increment of each of Samples 1 to 20 on a coordinate system were plotted, in which the value of the micro-bend loss characteristic factor $F_{\mu BL\_GO}$ is on the horizontal axis (X axis) and the value of the temperature characteristic test loss increment is on the vertical axis (Y axis). As a result, a scatter diagram as illustrated in FIG. 4 was obtained. A function was obtained from the scatter diagram by using the least squares method, and a linear function having a positive slope represented by the following Formula (7) was obtained. In addition, a correlation coefficient of the data of FIG. 4 was 92% or more.

$$Y = 2.5 \times 10^{-25} X + 0.0187 \tag{7}$$

In FIG. 4, the linear function is represented as a straight line L. As described above, it has been found that the value of the micro-bend loss characteristic factor $F_{\mu BL\_GO}$ and the value of the temperature characteristic test loss increment have a high correlation, and specifically, the value of the micro-bend loss characteristic factor $F_{\mu BL\_GO}$ and the value of the temperature characteristic test loss increment are in a substantially direct proportional relationship.

As described above, in the optical fiber cable, that is a tendency that it is required to set an increment of the transmission loss based on room temperature at −40° C. to 0.15 dB/km or less. Therefore, the value of the micro-bend loss characteristic factor $F_{\mu BL\_GO}$ was obtained based on Formula (7), and it was found that, in a case where the value is $5.2 \times 10^{23}$, the temperature characteristic test loss increment had a value slightly smaller than 0.15 dB/km.

Therefore, with the optical fiber cable 1 of the above-described one or more embodiments in which the value of the micro-bend loss characteristic factor $F_{\mu BL\_GO}$ is $5.2 \times 10^{23}$ or less, it is possible to suppress an increase in transmission loss in such a way that the increase in transmission loss becomes 0.15 dB/km or less under a low temperature environment of −40° C.

As illustrated in FIG. 4, it has been found that, in a case where the value of the micro-bend loss characteristic factor $F_{\mu BL\_GO}$ is $4.0 \times 10^{23}$ or less, the value of the temperature characteristic test loss increment, which is the increment of the transmission loss, can be 0.12 dB/km or less. In addition, it has been found that, in a case where the value of the micro-bend loss characteristic factor $F_{\mu BL\_GO}$ is $3.2 \times 10^{23}$ or less, the value of the temperature characteristic test loss increment, which is the increment of the transmission loss, can be 0.10 dB/km or less.

Although the present invention has been described with reference to the above-described embodiments as an example, the present invention is not limited thereto.

For example, in the above-described embodiments, the example in which the secondary covering layer is the outermost layer of the optical fiber has been described. However, even in a case where a colored layer is further provided as a third covering layer on an outer circumference of the secondary covering layer, a secondary layer and the colored layer can be collectively regarded as a second covering layer, that is, the secondary covering layer, and be applied to the present invention as long as a Young's modulus of the colored layer is not significantly different from the Young's modulus of the secondary covering layer.

In the above-described embodiments, an example in which the optical fiber cable is formed in a manner of accommodating the ribbon in the internal space 3S of the sheath 3 has been described. However, a plurality of single-core optical fibers may be accommodated in the internal space 3S to form the optical fiber cable. In the optical fiber cable including the single-core optical fibers, when the sheath 3 contracts in a low temperature environment, each optical fiber is pressed by the sheath 3. However, since the single-core optical fibers are not fixed to other optical fibers unlike the case of the ribbon, even when pressed by the sheath 3, the single-core optical fibers can move in the internal space 3S without being restricted by other optical fibers unlike the case of the ribbon. As described above, the single-core optical fiber has a high degree of freedom of movement in the internal space 3S. Therefore, a pressure applied to each optical fiber from the sheath 3 is reduced, and the micro-bend loss of the optical fiber can be reduced. Therefore, it is considered that an increase in transmission loss is smaller than that in the case of the ribbon. On the other hand, in a case where the optical fiber cable is formed using the ribbon, movement of individual optical fibers included in the ribbon is restricted by other optical fibers included in the ribbon. In this regard, the same applies regardless of the number of cores of the optical fibers included in the ribbon. That is, in the ribbon, it is considered that the degrees of freedom of movement of the individual optical fibers are substantially equal regardless of the number of cores of the optical fibers included in the ribbon. Therefore, in a case where the optical fiber cable is formed using the ribbon, even when the number of cores of the optical fibers included in the ribbon is other than 12, the pressure received by each optical fiber from the sheath 3 is substantially equal to that in the case of 12 cores, and it is considered that the micro-bend loss is also substantially equal. Therefore, even in a case where the optical fiber cable is formed by using the ribbons whose number is other than 12, the relationship between the value of the micro-bend loss characteristic factor $F_{\mu BL\_GO}$ and the value of the temperature characteristic test loss increment can be generally represented by Formula (7). Therefore, as the value of the micro-bend loss characteristic factor is set to $5.2 \times 10^{23}$ or less, it is possible to set the increase in transmission loss to 0.15 dB/km or less under a low temperature environment of −40° C. regardless of the number of cores of the optical fibers included in the ribbon.

According to one or more embodiments of the present invention, there is provided an optical fiber cable capable of suppressing an increase in transmission loss in a low temperature environment, and the optical fiber cable can be used in the field of communication infrastructure, for example.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical fiber cable comprising:
ribbons in which optical fibers are intermittently bonded with resin along a longitudinal direction; and
a sheath accommodating the ribbons in an internal space, wherein each of the optical fibers comprises:
    a glass portion including a core and a cladding surrounding the core;
    a primary covering layer that covers the cladding of the glass portion; and
    a secondary covering layer that covers the primary covering layer,
wherein a value of a micro-bend loss characteristic factor $F_{\mu BL\_GO}$ is $5.2 \times 10^{23}$ or less when represented by $$F_{\mu BL\_GO} = F_{\mu BL\_G} \times F_{\mu BL\_O} \times Dc,$$

where $F_{\mu BL\_G}$ ($Pa^{-1} \cdot m^{-10.5}$) is a geometry micro-bend loss characteristic of each optical fiber represented by $$F_{\mu BL\_G} = \frac{K_s^2}{H_f^2 \times D_o^{0.375} \times H_o^{0.625}},$$

$$K_s = \frac{E_p d_f}{t_p},$$

$$H_f = \frac{\pi}{4} E_g \left( \frac{d_f}{2} \right)^4,$$

$$D_o = E_p + \left( \frac{t_s}{R_s \times 2} \right)^3 E_s,$$

$$H_o = \frac{\pi}{4} E_s \left( R_s^4 - R_p^4 \right),$$

where
$H_f$ ($Pa \cdot m^4$) is a flexural rigidity of the glass portion,
$D_0$ (Pa)a is deformation resistance of the secondary covering layer, $H_0$ (Pa·m$^4$)a is flexural rigidity of the secondary covering layer, $E_g$ (GPa)a is Young's modulus of the glass portion, $E_p$ (MPa) is a Young's modulus of the primary covering layer, $E_s$ (MPa) is a Young's modulus of the secondary covering layer, $d_f$ (μm) is an outer diameter of the glass portion, $R_p$ (μm) is a radius of an outer circumferential surface of the primary covering layer, $R_s$ (μm) is a radius of an outer circumferential surface of the secondary covering layer, $t_p$ (μm) is a thickness of the primary covering layer, and $t_s$ (μm) is a thickness of the secondary covering layer, $F_{\mu BL\_O}$ (dB/turn) is an optical micro-bend loss characteristic of each optical fiber represented by $$F_{\mu BL\_O} = \frac{2w}{\lambda_{cc}} \times \alpha_{BL},$$

where 2w (μm) is a mode field diameter of light having a wavelength of 1310 nm propagating through each optical fiber, $\lambda_{cc}$ (μm) is a cable cutoff wavelength of each optical fiber, and $\alpha_{BL}$ (dB/turn) is a macro-bend loss with a radius of 10 mm of light having a wavelength of 1625 nm of each optical fiber, and Dc is a cable characteristic of the optical fiber cable represented by $$Dc=(0.5-a)^2/b,$$

where a is a porosity of the internal space and b is a number of cores of the optical fibers accommodated in the internal space, wherein the outer diameter $d_f$ of the glass portion is 80 (μm) or more and 90 (μm) or less, and the porosity of the internal space is 0.31 or more and 0.42 or less.

2. The optical fiber cable according to claim 1, wherein the value of the micro-bend loss characteristic factor $F_{\mu BL\_GO}$ is 4.0× 10$^{23}$ or less.

3. The optical fiber cable according to claim 2, wherein the value of the micro-bend loss characteristic factor $F_{\mu BL\_GO}$ is 3.2×10$^{23}$ or less.

4. The optical fiber cable according to claim 1, wherein a propagation constant difference corresponding to a difference between a propagation constant in LP01 mode of light having a wavelength of 1550 nm propagating through the optical fiber and a propagation constant in LP11 mode is 1.10×10$^4$ (rad/m) or more and 1.53×10$^4$ (rad/m) or less.

5. The optical fiber cable according to claim 1, wherein a value Ks corresponding to a value obtained by multiplying a Young's modulus $E_p$ (MPa) of the primary covering layer and an outer diameter $d_f$ (μm) of the glass portion, and dividing it by a thickness $t_p$ (μm) of the primary covering layer is 6.0×10$^5$ (Pa) or more and 1.2×10$^6$ (Pa) or less.

6. The optical fiber cable according to claim 1, wherein a flexural rigidity $H_f$ of the glass portion is 1.49×10$^{-7}$ (Pa·m$^4$) or more and 2.38×10$^{-7}$ (Pa·m$^4$) or less.

7. The optical fiber cable according to claim 1, wherein the deformation resistance $D_0$ of the secondary covering layer is 1.8×10$^6$ (Pa) or more and 3.6×10$^6$ (Pa) or less.

8. The optical fiber cable according to claim 1, wherein a flexural rigidity $H_0$ of the secondary covering layer is 2.09×10$^{-8}$ (Pa·m$^4$) or more and 3.22×10$^{-8}$ (Pa·m$^4$) or less.

9. The optical fiber cable according to claim 1, wherein a Young's modulus $E_p$ (MPa) of the primary covering layer is 0.13 (MPa) or more and 0.22 (MPa) or less.

10. The optical fiber cable according to claim 1, wherein a radius $R_p$ of the outer circumferential surface of the primary covering layer is 54.8 (μm) or more and 61.0 (μm) or less.

11. The optical fiber cable according to claim 1, wherein a radius $R_s$ of the outer circumferential surface of the secondary covering layer is 75.4 (μm) or more and 80.5 (μm) or less.

12. The optical fiber cable according to claim 1, wherein a sum of the thickness of the primary covering layer and the thickness of the secondary covering layer is 60 μm or less.

13. The optical fiber cable according to claim 12, wherein the sum of the thickness of the primary covering layer and the thickness of the secondary covering layer is 37.5 μm or less.

14. The optical fiber cable according to claim 1, wherein an outer diameter of the secondary covering layer is less than 160 μm.

\* \* \* \* \*